(12) United States Patent
Banerjee et al.

(10) Patent No.: US 11,118,062 B2
(45) Date of Patent: Sep. 14, 2021

(54) LIDAR REFLECTING DARK COLORED PIGMENTS AND VEHICLES COMPRISING THE SAME

(71) Applicant: Toyota Motor Engineering & Manufacturing North America, Inc., Erlanger, KY (US)

(72) Inventors: Debasish Banerjee, Ann Arbor, MI (US); Cynthia Gazepis Templeman, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 316 days.

(21) Appl. No.: 15/833,154

(22) Filed: Dec. 6, 2017

(65) Prior Publication Data

US 2019/0169440 A1 Jun. 6, 2019

(51) Int. Cl.
*C09C 3/06* (2006.01)
*C09C 1/04* (2006.01)
(Continued)

(52) U.S. Cl.
CPC ............... *C09C 3/06* (2013.01); *C08K 3/013* (2018.01); *C09C 1/0015* (2013.01); *C09C 1/04* (2013.01);
(Continued)

(58) Field of Classification Search
CPC ........... C09C 1/0015; C09C 1/04; C09C 1/24; C09C 1/642; C09C 3/06;
(Continued)

(56) References Cited

U.S. PATENT DOCUMENTS 6,989,056 B2 1/2006 Babler
8,460,456 B2 6/2013 Sanada
(Continued)

OTHER PUBLICATIONS

U.S. Appl. No. 62/465,605, filed Mar. 1, 2017.*
Banerjee, D. et al., "Narrow-band Omnidirectional Structural Color", SAE Int. J. Mater. Manf., Apr. 14, 2008.

*Primary Examiner* — Pegah Parvini
*Assistant Examiner* — Ross J Christie
(74) *Attorney, Agent, or Firm* — Dinsmore & Shohl LLP

(57) ABSTRACT

A LiDAR reflecting dark colored pigment includes a core layer formed from a reflecting material and a first layer formed from a first absorber material or a first dielectric material extending across the core layer. A second layer formed from a second absorber material different than the third absorber material extends across the first layer and a third layer formed from a third absorber material or a second dielectric material extends across the second layer. The third absorber material is different than the second absorber material. The LiDAR reflecting dark colored pigment reflects less than 10% of incident visible electromagnetic radiation and more than 60% of incident near-IR electromagnetic radiation with wavelengths between and including 850 nm and 950 nm for all incident angles of the visible and near-IR electromagnetic radiation between and including 0° and 45°. A color reflected by the multilayer stack has a lightness in CIELAB color space less than or equal to 40.

20 Claims, 7 Drawing Sheets

(51) Int. Cl.
*C09C 1/24* (2006.01)
*C08K 3/013* (2018.01)
*C09D 7/40* (2018.01)
*C09D 7/61* (2018.01)
*C09D 5/32* (2006.01)
*C09C 1/64* (2006.01)
*C09C 1/00* (2006.01)
*C09D 5/33* (2006.01)
*C08K 9/02* (2006.01)
*C08K 3/08* (2006.01)
*C08K 3/22* (2006.01)

(52) U.S. Cl.
CPC ............ *C09C 1/24* (2013.01); *C09C 1/642* (2013.01); *C09D 5/004* (2013.01); *C09D 5/32* (2013.01); *C09D 7/40* (2018.01); *C09D 7/61* (2018.01); *C01P 2006/62* (2013.01); *C08K 3/08* (2013.01); *C08K 9/02* (2013.01); *C08K 2003/0812* (2013.01); *C08K 2003/2241* (2013.01); *C09C 2200/1054* (2013.01); *C09C 2200/301* (2013.01); *C09C 2200/302* (2013.01); *C09C 2200/303* (2013.01); *C09C 2200/305* (2013.01); *C09C 2200/306* (2013.01); *C09C 2200/308* (2013.01); *C09C 2210/10* (2013.01)

(58) Field of Classification Search
CPC ...... C09C 2200/1054; C09C 2200/301; C09C 2200/302; C09C 2200/303; C09C 2200/305; C09C 2200/306; C09C 2200/308; C09C 2210/10; C09D 5/004; C09D 5/32; C09D 7/40; C09D 7/61; C08K 3/013; C08K 3/08; C08K 9/02; C08K 2003/0812; C08K 2003/2241; C01P 2006/62

See application file for complete search history.

(56) References Cited

U.S. PATENT DOCUMENTS

| | | | |
|---|---|---|---|
| 9,163,129 | B2 | 10/2015 | Kobayashi |
| 9,739,917 | B2 | 8/2017 | Banerjee et al. |
| 2014/0111861 | A1* | 4/2014 | Banerjee ............... G02B 5/285 359/584 |
| 2016/0215145 | A1 | 7/2016 | Maruyama et al. |
| 2018/0252847 | A1* | 9/2018 | Zieba ....................... C09C 1/62 |

* cited by examiner

LIDAR REFLECTING DARK COLORED PIGMENTS AND VEHICLES COMPRISING THE SAME

TECHNICAL FIELD

The present specification generally relates to pigments and, more specifically, to dark colored pigments that reflect near-IR electromagnetic radiation.

BACKGROUND

LiDAR systems using pulsed laser electromagnetic radiation with a wavelength of 905 nanometers have been proposed and tested for autonomous vehicle obstacle detection and avoidance systems. However, dark colored (e.g., black) pigments used in automotive paint to provide a dark colored vehicle absorb not only visible electromagnetic radiation but also near-IR electromagnetic radiation with a wavelength of 905 nanometers.

Accordingly, a need exists for alternative dark colored pigments that reflect near-IR electromagnetic radiation with a wavelength of 905 nanometers.

SUMMARY

In one embodiment, a LIDAR reflecting dark colored pigment includes a core layer formed from a reflecting material and a first layer formed from a first absorber material or a first dielectric material extending across the core layer. A second layer formed from a second absorber material different than the first absorber material extends across the first layer and a third layer formed from a third absorber material or a second dielectric material extends across the second layer. The third absorber material is different than the second absorber material. The pigment reflects less than 10% of incident visible electromagnetic radiation and more than 60% of incident near-IR electromagnetic radiation with wavelengths between and including 850 nm and 950 nm for all incident angles of the visible and near-IR electromagnetic radiation between and including 0 degrees and 45 degrees. A color reflected by the pigment has a lightness in CIELAB color space less than or equal to 40.

In embodiments, the first layer is formed from the first absorber material which may be a selective absorber material selected from be at least one of $Fe_2O_3$, TiN, Cu, and a brass alloy. In other embodiments, the first layer is formed from the first dielectric material selected from at least one of ZnS, $MgF_2$ and $TiO_2$. The second layer may be a semi-transparent absorber layer formed from a non-selective absorber material. The non-selective absorber material may be at least one of Cr, Ge, Ni, stainless steel, Pd, Ti, Si, V, Co, W, Mo, Nb, and alloys thereof. In some embodiments, the third layer is formed from the third absorber material. In such embodiments, the third layer may be formed from a selective absorber material, for example, at least one of $Fe_2O_3$, TiN, Cu, and a brass alloy. In other embodiments, the third layer is formed from the second dielectric material. In such embodiments, the third layer may be formed from at least one of ZnS, $MgF_2$ and $TiO_2$.

In one embodiment, the pigment includes the core layer formed from Al or an alloy thereof, the first layer formed from $Fe_2O_3$, the second layer formed from Cr or an alloy thereof, and the third layer formed from the third absorber layer, e.g., $Fe_2O_3$. In another embodiment, the pigment includes the core layer formed from Al or an alloy thereof, the first layer formed from $Fe_2O_3$, the second layer formed from Cr or an alloy thereof, and the third layer formed from the dielectric material, e.g., ZnS.

In another embodiment, a LiDAR reflecting dark colored paint includes a paint binder and a LiDAR reflecting dark colored pigment disposed in the paint binder. In some embodiments, a non-LiDAR reflecting dark colored pigment is disposed in the paint binder with the LiDAR reflecting dark colored pigment. In other embodiments, the LiDAR reflecting dark colored pigment is the only pigment disposed in the paint binder. The LiDAR reflecting dark colored pigment includes a first layer formed from a first absorber material or a first dielectric material extending across the core layer. A second layer formed from a second absorber material different than the first absorber material extends across the first layer and a third layer formed from a third absorber material or a second dielectric material extends across the second layer. The third absorber material is different than the second absorber material. The LiDAR reflecting dark colored pigment reflects less than 10% of incident visible electromagnetic radiation and more than 60% of incident near-IR electromagnetic radiation with wavelengths between and including 850 nm and 950 nm for all incident angles of the visible and near-IR electromagnetic radiation between 0 degrees (0°) and 45 degrees (45°). A color reflected by the multilayer stack has a lightness in CIELAB color space less than or equal to 40.

In embodiments, the first layer is formed from the first absorber material which may be a selective absorber material selected from be at least one of $Fe_2O_3$, TiN, Cu, and a brass alloy. In other embodiments, the first layer is formed from the first dielectric material selected from at least one of ZnS, $MgF_2$ and $TiO_2$. The second layer may be a semi-transparent absorber layer formed from a non-selective absorber material. The non-selective absorber material may be at least one of Cr, Ge, Ni, stainless steel, Pd, Ti, Si, V, Co, W, Mo, Nb, and alloys thereof. In some embodiments, the third layer is formed from the third absorber material. In such embodiments, the third layer may be formed from a selective absorber material, for example, at least one of $Fe_2O_3$, TiN, Cu, and a brass alloy. In other embodiments, the third layer is formed from the second dielectric material. In such embodiments, the third layer may be formed from at least one of ZnS, $MgF_2$ and $TiO_2$.

In still another embodiment, a vehicle includes a body panel coated a LiDAR reflecting dark colored paint. The LiDAR reflecting dark colored paint includes a paint binder and a LiDAR reflecting dark colored pigment disposed in the paint binder. In some embodiments, a non-LiDAR reflecting dark colored pigment is disposed in the paint binder with the LiDAR reflecting dark colored pigment. In other embodiments, the LiDAR reflecting dark colored pigment is the only pigment disposed in the paint binder. The LiDAR reflecting dark colored pigment includes a first layer formed from a first absorber material extending across the core layer. A second layer formed from a second absorber material different than the first absorber material extends across the first layer and a third layer formed from a third absorber material or a dielectric material extends across the second layer. The third absorber material is different than the second absorber material. The LiDAR reflecting dark colored pigment reflects less than 10% of incident visible electromagnetic radiation and more than 60% of incident near-IR electromagnetic radiation with wavelengths between and including 850 nm and 950 nm for all incident angles of the visible and near-IR electromagnetic radiation between and including 0° and 45°. A color reflected by the multilayer stack has a lightness in CIELAB color space less than or equal to 40, for example less than or equal to 30, less than or equal to 20, or less than or equal to 10.

In embodiments, the first layer is formed from the first absorber material which may be a selective absorber material selected from be at least one of $Fe_2O_3$, TiN, Cu, and a brass alloy. In other embodiments, the first layer is formed from the first dielectric material selected from at least one of ZnS, $MgF_2$ and $TiO_2$. The second layer may be a semi-transparent absorber layer formed from a non-selective absorber material. The non-selective absorber material may be at least one of Cr, Ge, Ni, stainless steel, Pd, Ti, Si, V, Co, W, Mo, Nb, and alloys thereof. In some embodiments, the third layer is formed from the third absorber material. In such embodiments, the third layer may be formed from a selective absorber material, for example, at least one of $Fe_2O_3$, TiN, Cu, and a brass alloy. In other embodiments, the third layer is formed from the second dielectric material. In such embodiments, the third layer may be formed from at least one of ZnS, $MgF_2$ and $TiO_2$.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
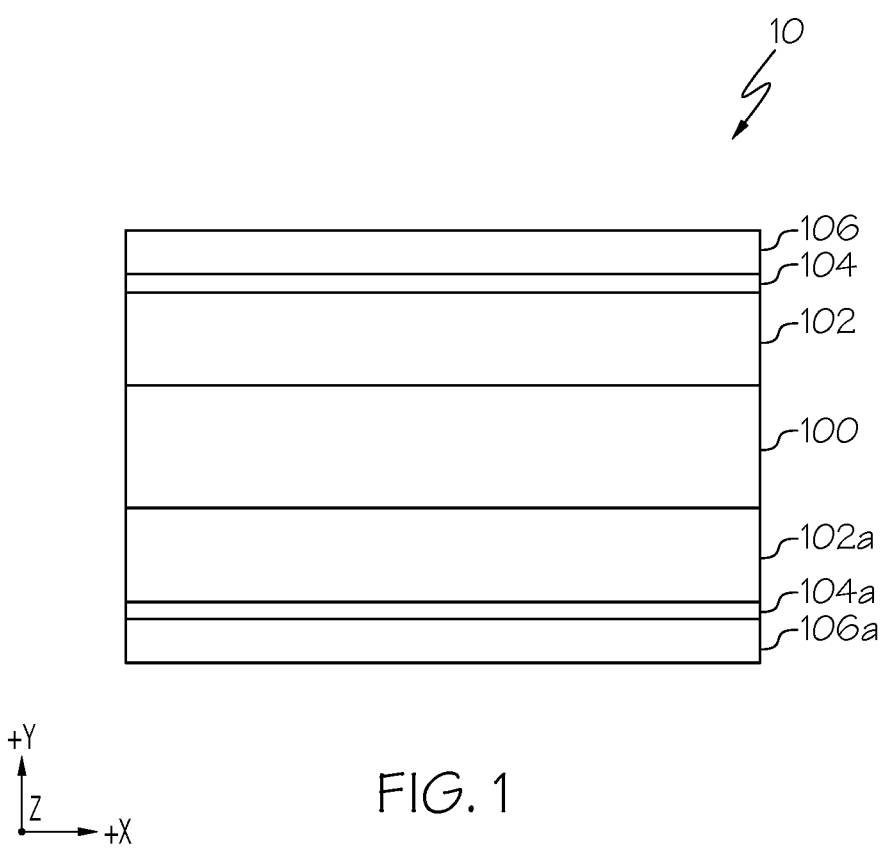
FIG. 1 schematically depicts a cross sectional view of a LiDAR reflecting dark colored pigment according to one or more embodiments disclosed and described herein.

According to one or more embodiments described herein, a Light Detection and Ranging (LiDAR) reflecting dark colored pigment may generally comprise a multilayer stack formed from layers of reflecting material and absorber materials, or layers of a reflecting material, absorber materials and a dielectric material. The terms "LiDAR reflecting pigment" and "LiDAR reflecting paint" used herein refer to pigments and paint, respectively, that reflect more than 60% of near-infrared (near-IR) electromagnetic radiation with wavelengths between and including 850 nm and 950 nm that is incident on the LiDAR reflecting dark colored pigment and the LiDAR reflecting dark colored paint at incident angles between 0 degree (0°) and 45 degrees (45°). The term "dark colored" refers to a color in CIELAB color space with a lightness (L*) less than or equal to 40. Accordingly, LiDAR reflecting dark colored pigments and LiDAR reflecting dark colored paint described herein display a dark color and reflect near-IR electromagnetic radiation with wavelengths between and including 850 nm and 950 nm such that LiDAR systems can detect an article coated with the LiDAR reflecting dark colored paint. It should be understood that incident angles referred to herein are relative to the normal of a surface. For example, an incident angle of 0° refers to an angle 0° from the normal of a surface and an incident angle of 45° refers to an angle 45° from the normal of a surface.

The LiDAR reflecting dark colored pigment reflects less than 10% of incident visible electromagnetic for all incident angles of visible electromagnetic radiation between and including 0° and 45°. Also, the LiDAR reflecting dark colored pigments may be omnidirectional pigments. As used herein, the term "omnidirectional" refers to: (1) a color of a LiDAR reflecting dark colored pigment described herein not changing appearance to an observer viewing a surface of the LiDAR reflecting dark colored pigment at angles between and including 0° and 45°; and (2) a maximum reflectance wavelength in the near-IR electromagnetic radiation spectrum reflected by the LiDAR reflecting dark colored pigment shifting less than 100 nm for near-IR electromagnetic radiation incident on the LiDAR reflecting dark colored pigment at incident angles between and including 0° and 45°. As used herein, the term "near-IR electromagnetic radiation" refers to electromagnetic radiation with wavelengths between and including 700 nm and 950 nm.

The LiDAR reflecting dark colored paint may be disposed on surfaces to provide an omnidirectional LiDAR reflecting dark colored surface. Non-limiting examples include surfaces of vehicle body panels such as vehicle door panels, vehicle quarter panels, and the like. Utilization of the LiDAR reflecting dark colored pigments allows dark colored vehicles to be detected with a LiDAR system. Various embodiments of LiDAR reflecting dark colored pigments and methods for using the same will be described in further detail herein with specific reference to the appended drawings.

FIG. 1 generally depicts one embodiment of a LiDAR reflecting dark colored pigment. The LiDAR reflecting dark colored pigment includes a multilayer stack with a core layer formed from a reflecting material (also referred to as a reflecting layer), a first layer formed from a first absorber material extending across the core layer, a second layer formed from a second absorber material extending across the first layer, and a third layer formed from a third absorber material or a dielectric material extending across the second layer. The multilayer stack reflects less than 10% of incident visible electromagnetic radiation and more than 60% of incident near-IR electromagnetic radiation with wavelengths between and including 850 nm and 950 nm for all incident angles of the visible and near-IR electromagnetic radiation between and including 0° and 45°. A color reflected by the multilayer stack has a lightness in CIELAB color space less than or equal to 40. It should be understood that the CIELAB color space refers to the CIE 1976 (L*, a*, b*) color space, adopted by the International Commission on Illumination (CIE) in 1976 with three axes corresponding to lightness (L*) and color (a*, b*). Lightness values L* (i.e., lightness) in CIELAB color space range from 0 to 100. As used herein, values of lightness between 0 and 40 correspond to dark colors, values of lightness between 75 and 100 correspond to light colors, and values of lightness between 40 and 75 correspond to a range of lightness between dark colors and light colors. It should also be understood that properties of LiDAR reflecting dark colored pigments, LiDAR reflecting dark colored layers, and LiDAR reflecting dark colored paint described herein refer to properties of the LiDAR reflecting dark colored pigments, the LiDAR reflecting dark colored layers, and the LiDAR reflecting dark colored paint when exposed to sunlight.

Still referring to FIG. 1, embodiments of a LiDAR reflecting dark colored pigment 10 are depicted. The LiDAR reflecting dark colored pigment 10 may include a core layer 100, a first layer 102 extending across the core layer 100, a second layer 104 extending across the first layer 102, and a third layer 106 extending across the second layer 104. In embodiments, the first layer 102 is in contact with the core layer 100, the second layer 104 is in contact with the first layer 102, and the third layer 106 is in contact with the second layer 104. As depicted in FIG. 1, in some embodiments the LiDAR reflecting dark colored pigments 10 are formed with the core layer 100 positioned between a pair of first layers 102, 102a, the pair of first layers 102, 102a are positioned between a pair of second layers 104, 104a, and the pair of second layers 104, 104a are positioned between a pair of third layers 106, 106a. That is, the first layer 102 extends across an upper surface (+Y direction) of the core layer 100, an oppositely disposed first layer 102a extends across a lower surface (−Y direction) of the core layer 100, the second layer 104 extends across an upper surface (+Y direction) of the first layer 102 and an oppositely disposed second layer 104a extends across a lower surface (−Y direction) of the first layer 102a. Also, the third layer 106 extends across an upper surface (+Y direction) of the second layer 104 and an oppositely disposed third layer 106a extends across a lower surface (−Y direction) of the second layer 104a. It should be understood that discussion herein of the first layer 102, the second layer 104, and the third layer 106 refers to both of the first layers 102, 102a, both of the second layers 104, 104a, and both of the third layers 106a, respectively, unless stated or described otherwise.

Non-limiting examples of materials used to form the core layer 100 include reflecting materials such as aluminum (Al), silver (Ag), chromium (Cr), and alloys thereof. As used herein, the term "reflecting material" refers to a material that generally reflects more than 70%, e.g., more 80% or more than 90%, of incident visible light. As used herein, the term "alloys thereof" does not limit alloys formed from only the elements listed unless stated otherwise. For example, the core layer 100 may be formed from Al, Ag, Cr, alloys of Al containing elements other than Ag and Cr, or alloys of Al containing elements in addition to Ag and/or Cr, etc. In the alternative, the core layer 100 may be formed Al alloys containing only Al, Ag and/or Cr, and incidental impurities present from the manufacture of the Al alloy. It should be understood that the core layer 100, and other core layers described herein, may prevent or block light from passing through the LiDAR reflecting dark colored pigment 10, i.e. the core layers may render the LiDAR reflecting dark colored pigments "opaque."

The first layer 102 may be formed from a first absorber material or a first dielectric material, the second layer 104 may be formed from a second absorber material, and the third layer 106 may be formed from a third absorber material or a second dielectric material. That is, in some embodiments, the first layer 102 is formed from a first absorber material, the second layer 104 is formed from a second absorber material, and the third layer 106 is formed from a third absorber material. In other embodiments, the first layer 102 is formed from a first dielectric material, the second layer 104 is formed from a second absorber material, and the third layer 106 is formed from a third absorber material. In still other embodiments, the first layer 102 is formed from a first absorber material, the second layer 104 is formed from a second absorber material, and the third layer 106 is formed from a second dielectric material. In still yet other embodiments, the first layer 102 is formed from a first dielectric material, the second layer 104 is formed from a second absorber material, and the third layer 106 is formed from a second dielectric material.

In embodiments where the first layer 102 is formed from the first absorber material, the first absorber material may be a selective absorber material. As used herein, the term "selective absorber" refers to an absorber material that absorbs a first range of visible light more than a second range of visible light. For example, a selective absorber material may absorb wavelengths between about 590 nm and about 700 nm (i.e., red and orange light) more than wavelengths between about 450 nm and about 490 nm (i.e., blue light). In the alternative, a selective absorber material may absorb wavelengths between about 400 nm and about 490 (i.e., violet and blue light) more than wavelength between about 590 nm and about 700 nm (red and orange light). Non-limiting examples of selective absorber materials include iron oxide ($Fe_2O_3$), titanium nitride (TiN), copper (Cu), and brass alloys. In embodiments where the first layer 102 is formed from the first dielectric material, non-limiting examples of the first dielectric material include zinc sulfide (ZnS), magnesium fluoride ($MgF_2$) and titanium dioxide ($TiO_2$).

The second absorber material may be a non-selective absorber material, i.e., an absorber material that generally absorbs all visible light equally. In some embodiments, the second layer 104 formed from the non-selective absorber material may be a semi-transparent layer. As used herein, the term "semi-transparent layer" refers to a layer formed from a non-selective absorber material wherein a portion of visible electromagnetic radiation passes through the layer. That is, the second layer 104 has a thickness as described below that allows a portion of incident visible electromagnetic radiation to pass through the second layer 104 even though it is formed from a non-selective absorber material. Non-limiting examples of non-selective absorber materials include chromium (Cr), germanium (Ge), nickel (Ni), palladium (Pd), titanium (Ti), amorphous silicon (Si), vanadium (V), cobalt (Co), tungsten (W), molybdenum (Mo), niobium (Nb), alloys thereof, and stainless steel alloys.

In embodiments where the third layer is formed from the third absorber material, the third absorber material may be a selective absorber material including without limitation $Fe_2O_3$, TiN, Cu, and brass alloys. In some embodiments, the third layer 106 is formed from the same selective absorber material as the first layer 102. In other embodiments, the third layer 106 is not formed from the same selective absorber material as the first layer 102. In embodiments where the third layer 106 is formed from the second dielectric material, non-limiting examples of the second dielectric material include ZnS, $MgF_2$ and $TiO_2$. In some embodiments, the third layer 106 is formed from the same dielectric material as the first layer 102. In other embodiments, the third layer 106 is not formed from the same dielectric material as the first layer 102.

One non-limiting example of the LiDAR reflecting dark colored pigment 10 includes a core layer 100 formed from Al or an alloy thereof, the first layer 102 formed from ZnS (first dielectric material), the second layer 104 formed from Cr, and the third layer 106 formed from $Fe_2O_3$ (third absorber material). Another non-limiting example of the LiDAR reflecting dark colored pigment 10 includes a core layer 100 formed from Al or an alloy thereof, the first layer 102 formed from ZnS (first dielectric material), the second layer 104 formed from Cr, and the third layer 106 formed from ZnS (second dielectric material). Still another non-limiting example of the LiDAR reflecting dark colored pigment 10 includes a core layer 100 formed from Al or an alloy thereof, the first layer 102 formed from $Fe_2O_3$ (first absorber material), the second layer 104 formed from Cr, and the third layer 106 formed from $Fe_2O_3$ (third absorber material). Still yet another non-limiting example of the LiDAR reflecting dark colored pigment 10 includes a core layer 100 formed from Al or an alloy thereof, the first layer 102 formed from $Fe_2O_3$ (first absorber material), the second layer 104 formed from Cr, and the third layer 106 formed from ZnS (second dielectric material).

In embodiments where the LiDAR reflecting dark colored pigment 10 includes first layers 102, 102a, second layers 104, 104a, and 106, 106a, the first layer 102 may be formed from the same material as the first layer 102a, the second layer 104 may be formed from the same material as the second layer 104a, and/or the third layer 106 may be formed from the same material as the third layer 106a. In the alternative, the first layer 102 may not formed from the same material as the first layer 102a, the second layer 104 may not formed from the same material as the second layer 104a, and/or the third layer 106 may not be formed from the same material as the third layer 106a.

One non-limiting example of the LiDAR reflecting dark colored pigment 10 includes a core layer 100 formed from Al or an alloy thereof, the first layers 102, 102a formed from ZnS (first dielectric material), the second layers 104, 104a formed from Cr, and the third layers 106, 106a formed from $Fe_2O_3$ (third absorber material). Another non-limiting example of the LiDAR reflecting dark colored pigment 10 includes a core layer 100 formed from Al or an alloy thereof, the first layers 102, 102a formed from ZnS (first dielectric material), the second layers 104, 104a formed from Cr, and the third layers 106, 106a formed from ZnS (second dielectric material). Still another non-limiting example of the LiDAR reflecting dark colored pigment 10 includes a core layer 100 formed from Al or an alloy thereof, the first layers 102, 102a formed from $Fe_2O_3$ (first absorber material), the second layers 104, 104a formed from Cr, and the third layers 106, 106a formed from $Fe_2O_3$ (third absorber material). Still yet another non-limiting example of the LiDAR reflecting dark colored pigment 10 includes a core layer 100 formed from Al or an alloy thereof, the first layers 102, 102a formed from $Fe_2O_3$ (first absorber material), the second layers 104, 104a formed from Cr, and the third layers 106, 106a formed from ZnS (second dielectric material).

The core layer 100 may have a thickness between about 50 nm and about 200 nm, for example a thickness greater than or equal to 50 nm, 75 nm, 100 nm, 125 nm, 150 nm or 175 nm, and less than or equal to 200 nm, 175 nm, 150 nm, 125 nm, 100 nm, or 75 nm. In embodiments, the core layer 100 has a thickness between about 75 nm and about 125 nm, for example between about 90 nm and about 110 nm.

In embodiments where the first layer 102 is formed from the first absorber material, the first layer may have a thickness between about 5 nm and 500 nm, for example a thickness greater than or equal to 5 nm, 25 nm, 50 nm, 100 nm, 150 nm, 200 nm, 250 nm, 300 nm or 400 nm, and less than 500 nm, 400 nm, 300 nm, 250 nm, 200 nm, 150 nm, 100 nm, 50 nm, or 25 nm. In embodiments, the first layer 102 has a thickness between about 100 nm and about 200 nm, for example between about 120 nm and about 140 nm. In embodiments where the first layer 102 is formed from the first dielectric material, the first layer 102 may have a thickness between about 0.1 quarter wave (QW) and about 4.0 QW of a control wavelength, for example a thickness greater than or equal to 0.1 QW, 0.5 QW, 1.0 QW, 2.0 QW, or 3.0 QW, and less than or equal to 4.0 QW, 3.0 QW, 2.0 QW, 1.0 QW, or 0.5 QW. As used herein, the term "quarter wave" or "quarter wave of a control wavelength" refers to a thickness equal to one quarter (¼) of a maximum reflectance wavelength of a band of electromagnetic radiation reflected by a LiDAR reflecting dark colored pigment. That is, the control wavelength is equivalent to the wavelength of a band of reflected electromagnetic radiation provided by the LiDAR reflecting dark colored pigments 10 with the maximum reflectance. In embodiments, the first layer 102 has a thickness between about 0.5 QW and about 3.0 QW, for example between about 1.0 QW and about 2.0 QW.

The second layer 104 may have a thickness between about 5 nm and 50 nm, for example a thickness greater than or equal to 5 nm, 10 nm, 15 nm, 20 nm, 25 nm, 30 nm, 35 nm, 40 nm or 45 nm, and less than 50 nm, 45 nm, 40 nm, 35 nm, 30 nm, 25 nm, 20 nm, 15 nm, or 10 nm. In embodiments, the second layer 104 has a thickness between about 10 nm and about 30 nm, for example between about 15 nm and about 25 nm.

In embodiments, where the third layer 106 is formed from the third absorber material, the third layer 106 may have a thickness between about 5 nm and 500 nm, for example a thickness greater than or equal to 5 nm, 25 nm, 50 nm, 100 nm, 150 nm, 200 nm, 250 nm, 300 nm or 400 nm, and less than 500 nm, 400 nm, 300 nm, 250 nm, 200 nm, 150 nm, 100 nm, 50 nm, or 25 nm. In embodiments, the third layer 106 has a thickness between about 25 nm and about 75 nm, for example between about 35 nm and about 55 nm. In embodiments, where the third layer 106 is formed from the second dielectric material, the third layer 106 may have a thickness between about 0.1 QW and about 4.0 QW of a control wavelength, for example a thickness greater than or equal to 0.1 QW, 0.5 QW, 1.0 QW, 2.0 QW, or 3.0 QW, and less than or equal to 4.0 QW, 3.0 QW, 2.0 QW, 1.0 QW, or 0.5 QW.

In embodiments, the third layer 106 has a thickness between about 0.5 QW and about 3.0 QW, for example between about 1.0 QW and about 2.0 QW.

In embodiments where the LiDAR reflecting dark colored pigment 10 includes first layers 102, 102a, second layers 104, 104a, and 106, 106a, the first layer 102 may generally have the same thickness as the first layer 102a, the second layer 104 may generally have the same thickness as the second layer 104a, and/or the third layer 106 may generally have the same thickness as the third layer 106a. In the alternative, the first layer 102 may not have the same thickness as the first layer 102a, the second layer 104 may not have the same thickness as the second layer 104a, and/or the third layer 106 may not have the same thickness as the third layer 106a.

While FIG. 1 depicts a seven-layer LiDAR reflecting dark colored pigment 10, it should be understood that LiDAR reflecting dark colored pigments with less than seven layers or more than seven layers may be used to provide a dark colored paint that reflects more than 60% LiDAR when the dark colored paint is exposed to sunlight.

Figure 2A:
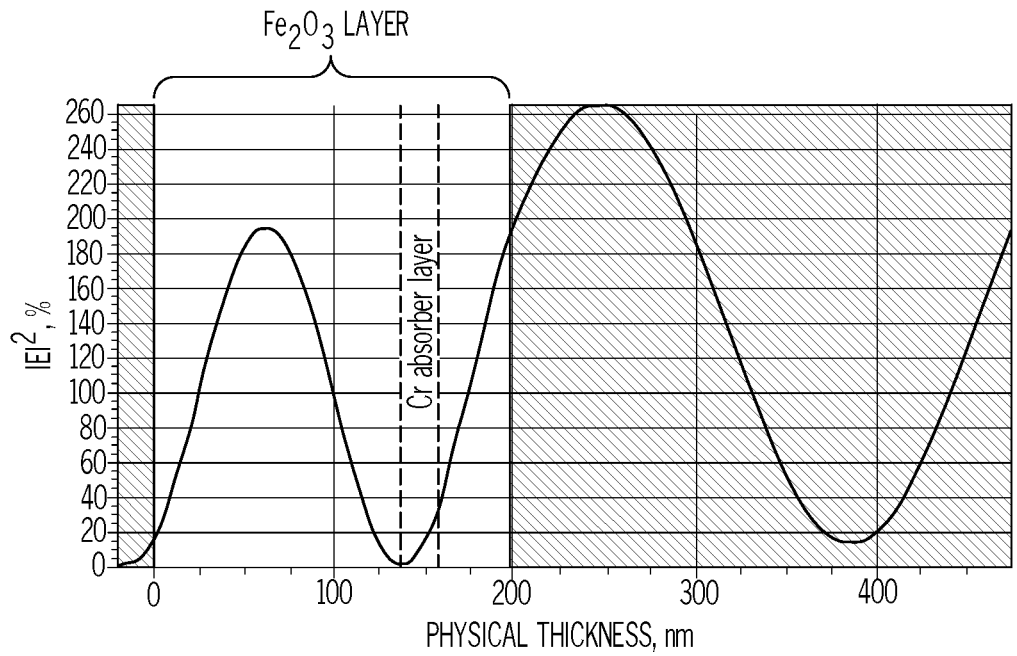
FIG. 2A graphically depicts electric field percentage ($|E|^2$, %) as a function of thickness for a LiDAR reflecting dark colored pigment of FIG. 1 exposed to electromagnetic radiation with a wavelength of 800 nm.
Figure 2B:
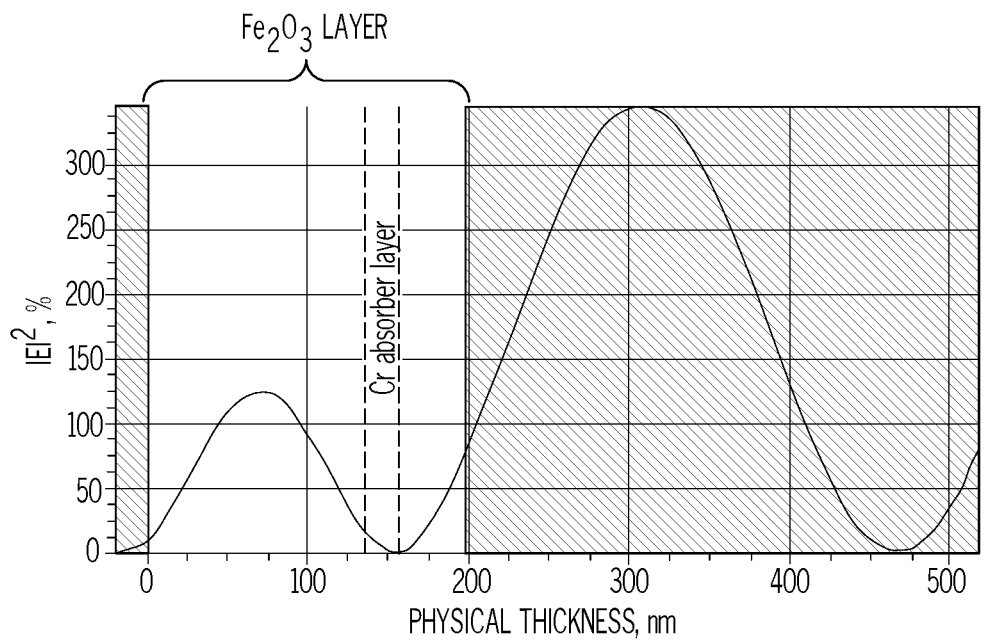
FIG. 2B graphically depicts electric field percentage ($|E|^2$, %) as a function of thickness for a LiDAR reflecting dark colored pigment of in FIG. 1 exposed to electromagnetic radiation with a wavelength of 920 nm.

While not being bound by theory, it is hypothesized that the thickness (Y direction) of the first layer 102 and/or positioning of the second layer 104 of the LiDAR reflecting dark colored pigment 10 may be determined with an analysis of electric field within the LiDAR reflecting dark colored pigment 10 as function of electromagnetic radiation wavelength. Particularly, the electric field corresponding to a particular wavelength of electromagnetic radiation plotted as a function of thickness of the first layer 102 may be used to determine the thickness of the first layer 102, and where the second layer 104 should be located within the LiDAR reflecting dark colored pigment 10, in order for the LiDAR reflecting dark colored pigment 10 to reflect near-IR electromagnetic radiation. For example, and with reference to FIGS. 2A and 2B, a simulation of percentage electric field ($|E|^2$, %) corresponding to incident electromagnetic radiation with a wavelength of 800 nm versus thickness of a first layer 102 formed from $Fe_2O_3$ is graphically depicted in FIG. 2A, and a simulation of percentage electric field corresponding to incident electromagnetic radiation with a wavelength of 920 nm versus thickness of the first layer 102 formed from $Fe_2O_3$ is graphically depicted in FIG. 2B. The percentage electric fields were simulated assuming the first layer 102 had a thickness of 200 nm. As depicted in FIGS. 2A and 2B, incident electromagnetic radiation with a wavelength of 800 nm resulted in a zero percentage electric field within the first layer 102 at a thickness of about 135 nm (FIG. 2A), and incident electromagnetic radiation with a wavelength of 920 nm resulted in a zero percentage electric field within the first layer 102 at a thickness of about 155 nm. Accordingly, an interface between the first layer 102 and the second layer 104 at a first layer thickness of about 135 nm and an interface between the second layer 104 and the third layer 106 at a third layer thickness of about 20 nm will result in electromagnetic radiation with wavelengths between about 800 nm and about 920 nm transmitting through the interface and propagating to the core layer 100. That is, inserting a second layer 104 at a first layer thickness of 135 nm will allow electromagnetic radiation with wavelengths between 800 nm and 920 nm to propagate through the third layer 106, second layer 104 and first layer 102 to the core layer 100 where it is reflected and propagates back through the first layer 102, second layer 104 and third layer 106. Though not shown in FIGS. 2A and 2B, electromagnetic radiation with wavelengths not between 800 nm and 920 nm, e.g., wavelengths in the visible spectrum, result in a high percentage electric field at the first layer thicknesses of 125 nm and 155 nm. Accordingly, electromagnetic radiation in the visible spectrum does not propagate through the interfaces between the first layer 102, second layer 104 and third layer 106 graphically depicted in FIGS. 2A and 2B.

Figure 3:
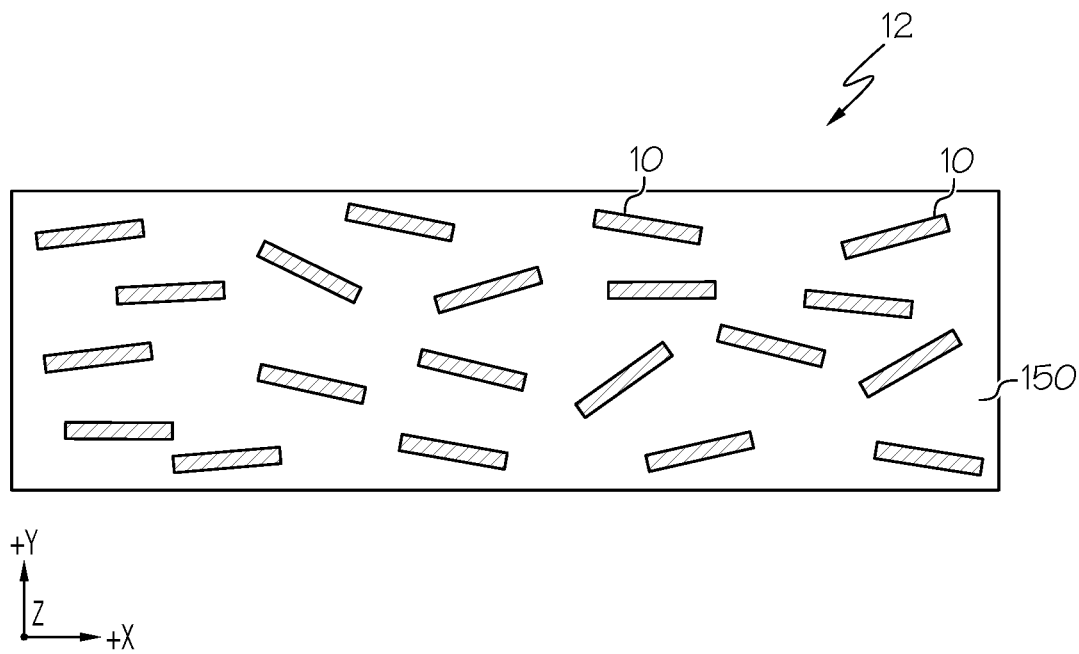
FIG. 3 schematically depicts a cross sectional view of a LiDAR reflecting dark colored paint layer on an article according to one or more embodiments disclosed and described herein.

Referring now to FIG. 3, an embodiment of a LiDAR reflecting dark colored layer 12, e.g., a paint layer, with a plurality of LiDAR reflecting dark colored pigments 10 is depicted. Particularly, the LiDAR reflecting dark colored layer 12 includes a plurality of LiDAR reflecting dark colored pigments 10 disposed in a binder 150, e.g., a paint binder. Non-limiting examples of binders including enamel paint binders, urethane paint binders, and combination enamel-urethane paint binders. The LiDAR reflecting dark colored layer 12 appears as a dark color to an observer viewing the LiDAR reflecting dark colored layer 12 and reflects near-IR electromagnetic radiation with a wavelength of 905 nm. That is, the LiDAR reflecting dark colored layer 12 exposed to sunlight and viewed by an observer has a color with a lightness in CIELAB color space of less than or equal to 40 and reflects an average of more than 60% of near-IR electromagnetic radiation with a wavelength of 905 nm. In some embodiments, the LiDAR reflecting dark colored layer 12 exposed to sunlight reflects an average of less than 10% of electromagnetic radiation in the visible spectrum and has a lightness in CIELAB color space of less than or equal to 30, for example less than or equal to 20. In such embodiments, the LiDAR reflecting dark colored layer 12 exposed to sunlight may have a lightness in CIELAB color space of less than or equal to 10. As used herein, the term "average" refers to an average of ten (10) reflectance values equally distanced apart along a specified reflectance spectrum for a LiDAR reflecting dark colored pigment or LiDAR reflecting dark colored layer described herein. Also, the terms "reflects more than" and "reflects less than" as used herein refers to "reflects an average of more than" and "reflects an average or less than", respectively, unless otherwise stated.

Figure 4:
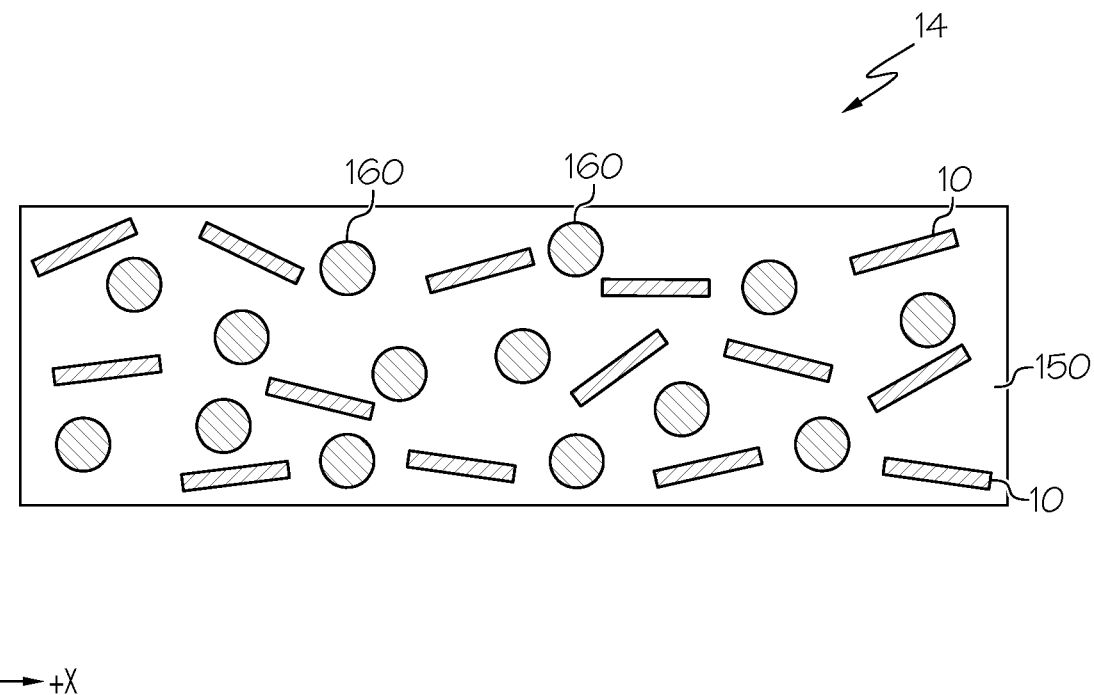
FIG. 4 schematically depicts a cross sectional view of a LiDAR reflecting dark colored paint layer on an article according to one or more embodiments disclosed and described herein.

Referring now to FIG. 4, another embodiment of a LiDAR reflecting dark colored layer 14, e.g., a paint layer, with a plurality of LiDAR reflecting dark colored pigments 10 and a plurality of non-LiDAR reflecting dark colored pigments 160 is depicted. Particularly, the LiDAR reflecting dark colored layer 14 includes the plurality of LiDAR reflecting dark colored pigments 10 and the plurality of non-LiDAR reflecting dark colored pigments 160 disposed in the binder 150. The color of the LiDAR reflecting dark colored layer 14 may be provided by the plurality of non-LiDAR reflecting dark colored pigments 160 and reflection of near-IR electromagnetic radiation with a wavelength of 905 nm is provided by the plurality of LiDAR reflecting dark colored pigments 10. In the alternative, the color of the LiDAR reflecting dark colored layer 14 may be provided by a combination of the plurality of non-LiDAR reflecting dark colored pigments 160 and the plurality of LiDAR reflecting dark colored pigments 10, and reflection of near-IR electromagnetic radiation with a wavelength of 905 nm is provided by the plurality of LiDAR reflecting dark colored pigments 10. Non-limiting examples of non-LiDAR reflecting dark colored pigments 160 include cadmium pigments, cobalt pigments, copper pigments, iron oxide pigments, manganese pigments, titanium pigments, carbon pigments, and the like. It should be understood that the LiDAR reflecting dark colored layer 14 appears as a dark color to an observer viewing the LiDAR reflecting dark colored layer 14 and reflects near-IR electromagnetic radiation with a wavelength of 905 nm. That is, the LiDAR reflecting dark colored layer 14 exposed to sunlight and viewed by an observer has a color with lightness in CIELAB color space of less than or equal to 40 and reflects more than 60% of near-IR electromagnetic radiation with a wavelength of 905 nm. In some embodiments, the LiDAR reflecting dark colored layer 14 exposed to sunlight reflects an average of less than 10% of electromagnetic radiation in the visible spectrum and has a lightness in CIELAB color space of less than or equal to 30, for example less than or equal to 20. In such embodiments, the LiDAR reflecting dark colored layer 14 exposed to sunlight may have a lightness in CIELAB color space of less than or equal to 10.

Figure 5:
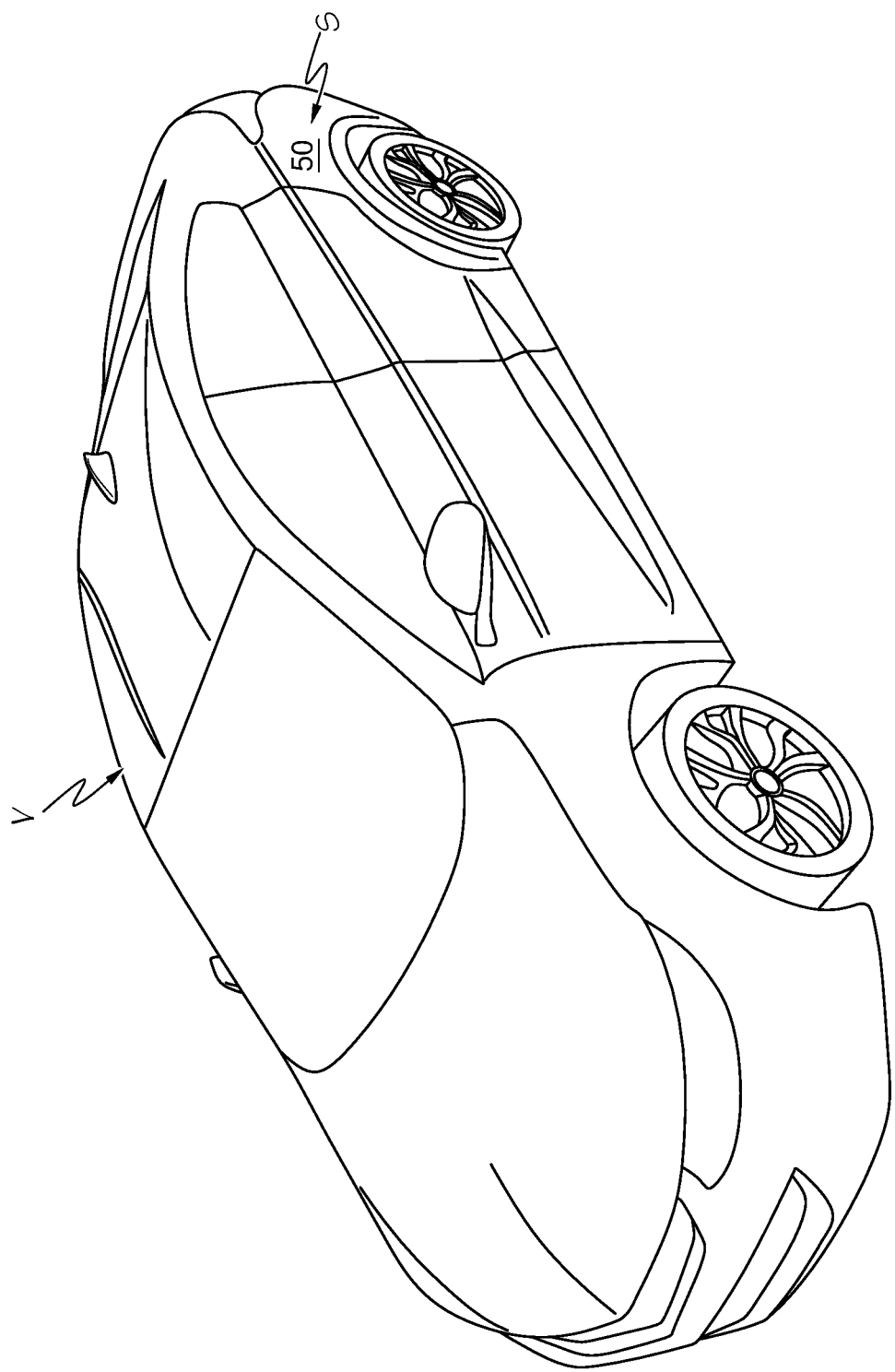
FIG. 5 schematically depicts a vehicle with side panels painted with a LiDAR reflecting dark colored paint according to one or more embodiments disclosed and described herein.
Figure 6:
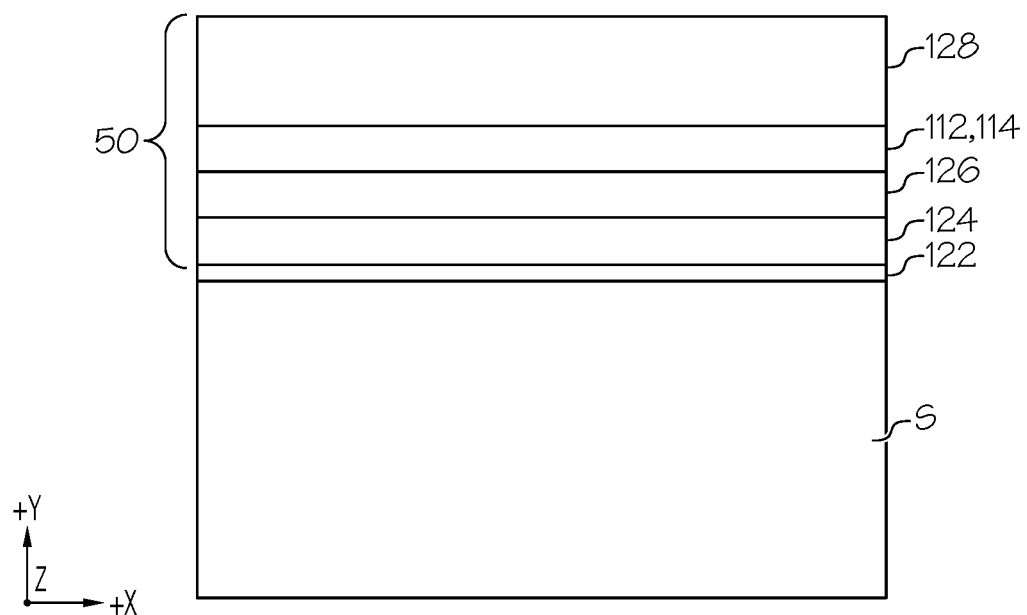
FIG. 6 schematically depicts a cross sectional view of a side panel painted with the LiDAR reflecting dark colored paint in FIG. 5.

Referring now to FIGS. 5 and 6, embodiments of a vehicle 'V' painted with a LiDAR reflecting dark colored paint are depicted. Particularly, FIG. 5 depicts the vehicle V with a side panel 'S' coated with a LiDAR reflecting dark colored paint 50 and FIG. 6 depicts a cross section of one of the side panel S with the LiDAR reflecting dark colored paint 50. The LiDAR reflecting dark colored paint 50 may include a plurality of layers that provide surface protection and a desired color. For example, the LiDAR reflecting dark colored paint 50 may include a phosphate layer 122, an electrocoating layer 124, a primer layer 126, a color layer 112 or a color layer 114 (also known as a basecoat or basecoat layer) and a clear coat layer 128. Non-limiting examples of a phosphate layer include a manganese phosphate layer, an iron phosphate layer, a zinc phosphate layer, and combinations thereof. Non-limiting examples of an electrocoating layer include an anodic electrocoating layer and a cathodic electrocoating layer. Non-limiting examples of a primer layer include an epoxy primer layer and a urethane primer layer. Non-limiting examples of a clear coat layer include a urethane clear coat layer and an acrylic lacquer clear coat layer. It should be understood that the LiDAR reflecting dark colored paint 50 appears as a dark color to an observer viewing the LiDAR reflecting dark paint and reflects near-IR electromagnetic radiation with a wavelength of 905 nm. That is, the LiDAR reflecting dark colored paint 50 exposed to sunlight and viewed by an observer has a color with lightness in CIELAB color space of less than or equal to 40 and reflects more than 60% of near-IR electromagnetic radiation with a wavelength of 905 nm. In some embodiments, the LiDAR reflecting dark colored paint 50 exposed to sunlight reflects an average of less than 10% of electromagnetic radiation in the visible spectrum and has a lightness in CIELAB color space of less than or equal to 30, for example less than or equal to 20. In such embodiments, the LiDAR reflecting dark colored paint 50 exposed to sunlight may have a lightness in CIELAB color space of less than or equal to 10.

As noted above LiDAR reflecting dark colored pigments described herein may be used in paint to provide LiDAR reflecting dark colored articles that can be detected with LiDAR systems using near-IR electromagnetic radiation with a wavelength of 905 nm. That is, articles desired to be detected by LiDAR systems such as automobiles, motorcycles, bicycles, and the like, may be painted with a LiDAR reflecting dark colored paint described herein and thereby provide a dark colored article a desired ark color and yet be detectable by a LiDAR system using near-IR electromagnetic radiation with a wavelength of 905 nm.

EXAMPLES

Figure 7A:
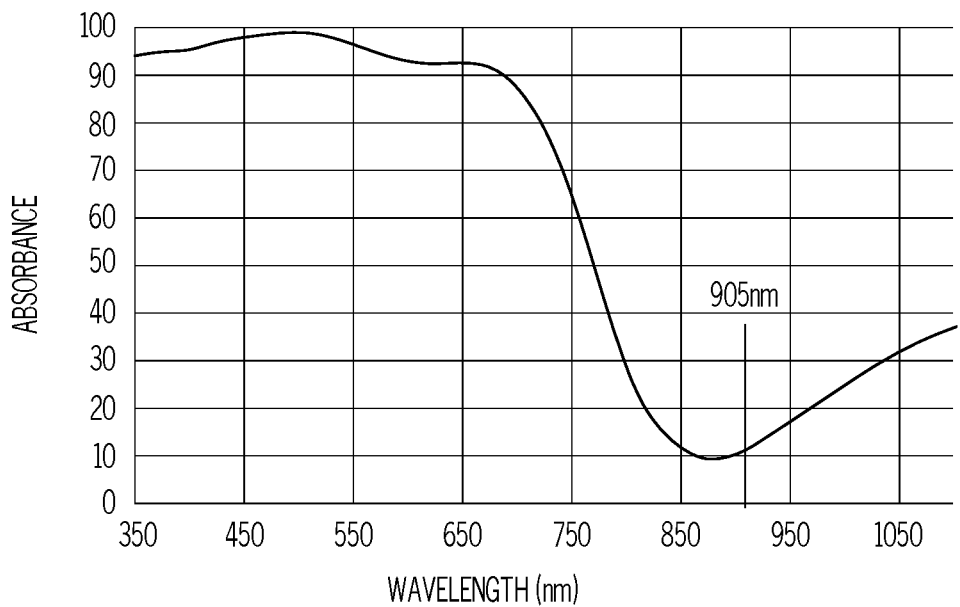
FIG. 7A graphically depicts percent absorption as a function of electromagnetic radiation wavelength for a LiDAR reflecting dark colored pigment exposed to sunlight according to one or more embodiments disclosed and described herein.
Figure 7B:
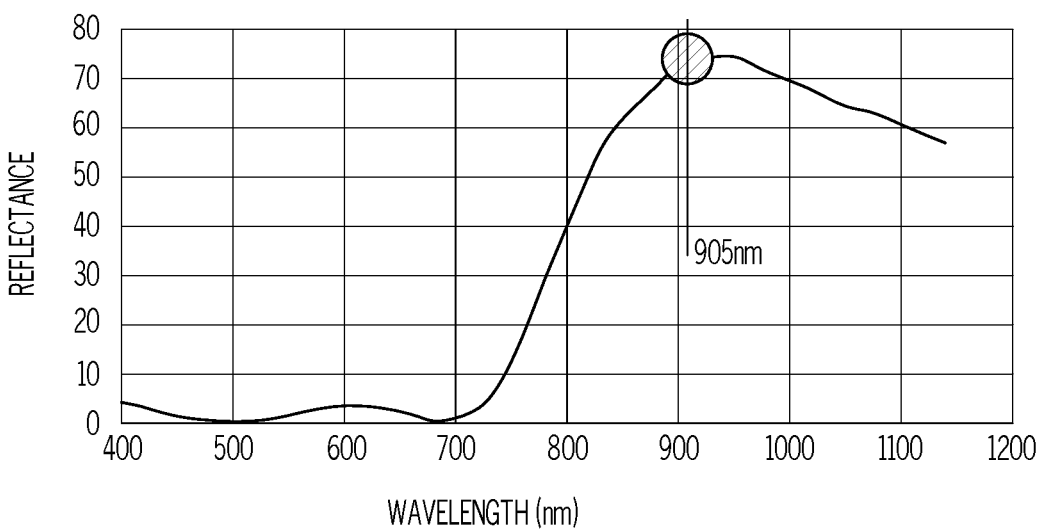
FIG. 7B graphically depicts percent reflectance as a function of electromagnetic radiation wavelength for a LiDAR reflecting dark colored pigment exposed to sunlight according to one or more embodiments disclosed and described herein.

Referring now to FIGS. 1, 7A and 7B, absorption and reflectance of a LiDAR reflecting dark colored pigment 10 schematically depicted in FIG. 1 are graphically depicted in FIGS. 7A and 7B. The LiDAR reflecting dark colored pigment 10 includes an Al core layer with a thickness of about 200 nm, a first layer formed from $Fe_2O_3$ with a thickness of about 135 nm, a second layer formed from Cr with a thickness of about 20 nm, and a third layer formed from $Fe_2O_3$ with a thickness of about 45 nm. Exposure of the LiDAR reflecting dark colored pigment 10 to sunlight was simulated at light incident angles of 0°, 15°, 30°, and 45°. FIGS. 7A and 7B graphically depict absorbance and reflectance, respectively, of the LiDAR reflecting dark colored pigment 10 at an incidence angle of 0°. Particularly, FIG. 7A graphically depicts the LiDAR reflecting dark colored pigment 10 absorbing more than 60% of electromagnetic radiation with wavelengths between about 350 nm and about 750 nm, more than 75% of electromagnetic radiation with wavelengths between about 350 nm and about 725 nm, more than 80% of electromagnetic radiation with wavelengths between about 350 nm and about 700 nm, and more than 90% of electromagnetic radiation with wavelengths between about 350 nm and about 650 nm. In contrast, the LiDAR reflecting dark colored pigment 10 absorbs less than 20% of electromagnetic radiation with wavelengths between about 800 nm and about 950 nm, and less than 15% of electromagnetic radiation with wavelengths between about 850 nm and about 950 nm.

FIG. 7B graphically depicts the LiDAR reflecting dark colored pigment 10 reflecting less than 10% of electromagnetic radiation with wavelengths between about 350 nm and about 750 nm and less than 5% of electromagnetic radiation with wavelengths between about 350 nm and about 725 nm. In contrast, the LiDAR reflecting dark colored pigment 10 reflects more than 60% of electromagnetic radiation with wavelengths between about 800 nm and about 110 nm, and more than 70% of electromagnetic radiation with wavelengths between about 890 nm and about 1000 nm.

Figure 8:
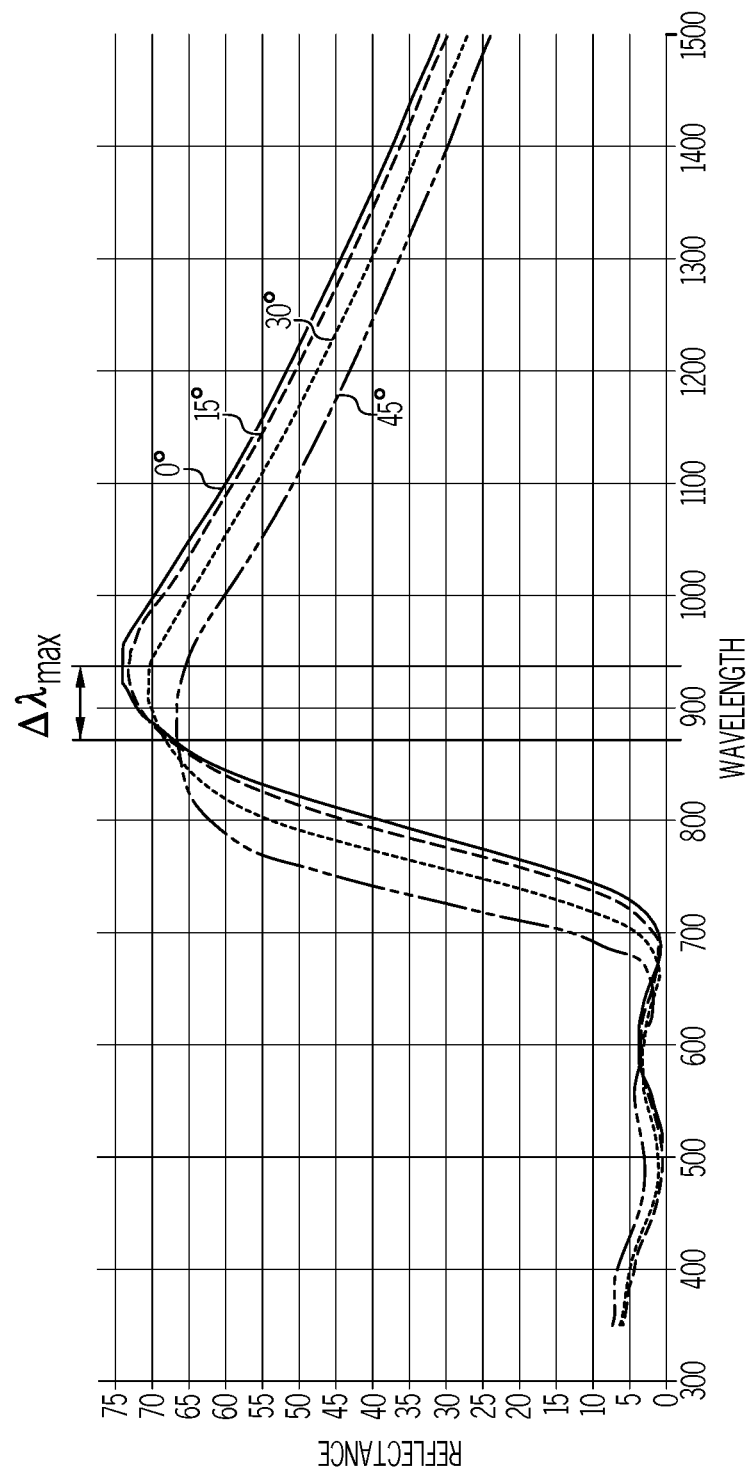
FIG. 8 graphically depicts reflectance as a function of electromagnetic radiation wavelength for a LiDAR reflecting dark colored pigment exposed to sunlight at incident angles of 0°, 15°, 30°, and 45° according to one or more embodiments disclosed and described herein.

FIG. 8 graphically depicts the omnidirectional reflection of the LiDAR reflecting dark colored pigment 10. Particularly, reflectance from the LiDAR reflecting dark colored pigment 10 exposed to simulated sunlight at incident angles of 0°, 15°, 30°, and 45° is graphically depicted in FIG. 8. The reflectance of visible electromagnetic radiation with wavelengths between 350 nm and 700 nm is less than about 10% for all angles of incident sunlight between and including 0° and 45°. Also, the maximum reflectance wavelength from the LiDAR reflecting dark colored pigment 10 is about 940 nm for an incident sunlight angle of 0° and about 875 nm for an incident sunlight angle of 45°. Accordingly, the shift or movement of the maximum reflectance wavelength ($\Delta\lambda_{max}$) from the LiDAR reflecting dark colored pigment 10 for sunlight incident on the LiDAR reflecting dark colored pigment 10 at incident angles between and including 0° and 45° is less or equal than 100 nm, e.g., less than or equal to 75 nm, or less than or equal to 65 nm.

Directional terms as used herein—for example up, down, right, left, front, back, top, bottom, vertical, horizontal—are made only with reference to the figures as drawn and are not intended to imply absolute orientation unless otherwise expressly stated. The terms "generally," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. In general, any quantitative comparison, value, measurement, or other representation is "about" or "approximate" whether or not expressly stated to be such. Also, start points and endpoints of ranges are disclosed herein and it is contemplated that any single start point can be used in conjunction with any given endpoint and the ranges include the start and endpoints unless otherwise noted. For example, the range "greater than or equal to 50 nm, 75 nm, 100 nm, 125 nm, 150 nm or 175 nm, and less than or equal to 200 nm, 175 nm, 150 nm, 125 nm, 100 nm, or 75 nm" includes any combination of the start points between and including 50 nm, 75 nm, 100 nm, 125 nm, 150 nm or 175 nm and the end points between and including 200 nm, 175 nm, 150 nm, 125 nm, 100 nm, or 75 nm, so long and as the end point is greater than the start part.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A pigment comprising:
   a core layer formed from a reflecting material;
   a first layer extending across the core layer, the first layer formed from a first absorber material or a first dielectric material, wherein the first layer has a thickness from about 5 nm to about 500 nm;
   a second layer extending across the first layer, the second layer formed from a second absorber material different than the first absorber material, wherein the second layer has a thickness from about 5 nm to about 50 nm; and
   a third layer extending across the second layer, the third layer formed from a third absorber material or a second dielectric material, the third absorber material being different than the second absorber material, wherein the third layer has a thickness from about 5 nm to about 500 nm;
   wherein:
   the pigment reflects less than 10% of incident visible electromagnetic radiation for all incident angles of the visible electromagnetic radiation between and including 0° and 45°; and
   the pigment reflects more than 60% of incident near-IR electromagnetic radiation with wavelengths between and including 850 nm and 950 nm for all incident angles of the near-IR electromagnetic radiation between and including 0° and 45°.

2. The pigment of claim 1, wherein the first layer is formed from the first absorber material and the first absorber material comprises a selective absorber material.

3. The pigment of claim 2, wherein the selective absorber material is at least one of $Fe_2O_3$, TiN, Cu and brass.

4. The pigment of claim 1, wherein the first layer is formed from the first dielectric material and the first dielectric material comprises at least one of ZnS, $MgF_2$ and $TiO_2$.

5. The pigment of claim 1, wherein the second absorber material is a non-selective absorber material comprising at least one of Cr, Ge, Ni, stainless steel, Pd, Ti, Si, V, Co, W, Mo, Nb, and alloys thereof.

6. The pigment of claim 1, wherein the third layer is formed from the third absorber material and the third absorber material comprises a selective absorber material.

7. The pigment of claim 6, wherein the selective absorber material is at least one of $Fe_2O_3$, TiN, Cu and brass.

8. The pigment of claim 1, wherein the third layer is formed from the second dielectric material.

9. The pigment of claim 8, wherein the second dielectric material is at least one of ZnS, $MgF_2$ and $TiO_2$.

10. The pigment of claim 1, wherein:
    the reflecting material is at least one of Al or an alloy thereof;
    the first layer is formed from the first dielectric material and the first dielectric material comprises ZnS;
    the second absorber material is Cr or an alloy thereof; and
    the third layer is formed from the third absorber material and the third absorber material comprises $Fe_2O_3$.

11. The pigment of claim 1, wherein:
    the reflecting material is at least one of Al or an alloy thereof;
    the first layer is formed from the first dielectric material and the first dielectric material comprises ZnS;
    the second absorber material is Cr or an alloy thereof; and
    the third layer is formed from the second dielectric material and the second dielectric material comprises ZnS.

12. The pigment of claim 1, wherein:
    the reflecting material is at least one of Al or an alloy thereof;
    the first layer is formed from the first absorber material and the first absorber material comprises $Fe_2O_3$;
    the second absorber material is Cr or an alloy thereof; and
    the third layer is formed from the third absorber material and the third absorber material comprises $Fe_2O_3$.

13. The pigment of claim 1, wherein:
    the reflecting material is at least one of Al or an alloy thereof;
    the first layer is formed from the first absorber material and the first absorber material comprises $Fe_2O_3$;
    the second absorber material is Cr or an alloy thereof; and
    the third layer is formed from the second dielectric material and the second dielectric material comprises ZnS.

14. A paint comprising:
    a paint binder;
    a LiDAR reflecting dark colored pigment disposed in the paint binder and forming a LiDAR reflecting dark colored paint, the LiDAR reflecting dark colored pigment comprising:
    a core layer formed from a reflecting material;
    a first layer extending across the core layer, the first layer formed from a first absorber material or a first dielectric material, wherein the first layer has a thickness from about 5 nm to about 500 nm;
    a second layer extending across the first layer, the second layer formed from a second absorber material different than the first absorber material, wherein the second layer has a thickness from about 5 nm to about 50 nm; and
    a third layer extending across the second layer, the third layer formed from a third absorber material or a second dielectric material, the third absorber material being different than the second absorber material, wherein the third layer has a thickness from about 5 nm to about 500 nm;
    wherein:
    the LiDAR reflecting dark colored paint reflects less than 10% of incident visible electromagnetic radiation for all incident angles of the visible electromagnetic radiation between and including 0° and 45°;
    the LiDAR reflecting dark colored paint reflects more than 60% of incident near-IR electromagnetic radiation with wavelengths between and including 850 nm and 950 nm for all incident angles of the near-IR electromagnetic radiation between and including 0° and 45°; and the LiDAR reflecting dark colored paint has a color with a lightness in CIELAB color space less than or equal to 40.

15. The paint of claim 14, wherein the first absorber material is a selective absorber material comprising at least one of $Fe_2O_3$, TiN, Cu and brass, and the first dielectric material comprises at least one of ZnS, $MgF_2$ and $TiO_2$.

16. The paint of claim 14, wherein the second absorber material is a non-selective absorber material selected from at least one of Cr, Ge, Ni, stainless steel, Pd, Ti, Si, V, Co, W, Mo, Nb, and alloys thereof.

17. The paint of claim 14, wherein the third absorber material is a selective absorber material comprising at least one of $Fe_2O_3$, TiN, Cu and brass, and the second dielectric material comprises at least one of ZnS, $MgF_2$ and $TiO_2$.

18. A vehicle comprising:
a body panel coated a LiDAR reflecting dark colored paint, the LiDAR reflecting dark colored paint comprising:
a paint binder;
a LiDAR reflecting dark colored pigment disposed in the paint binder, the LiDAR reflecting dark colored pigment comprising:
a core layer formed from a reflecting material;
a first layer extending across the core layer, the first layer formed from a first absorber material or a first dielectric material, wherein the first layer has a thickness from about 5 nm to about 500 nm;
a second layer extending across the first layer, the second layer formed from a second absorber material different than the first absorber material, wherein the second layer has a thickness from about 5 nm to about 50 nm; and
a third layer extending across the second layer, the third layer formed from a third absorber material or a second dielectric material, the third absorber material being different than the second absorber material, wherein the third layer has a thickness from about 5 nm to about 500 nm;
wherein:
the LiDAR reflecting dark colored paint reflects less than 10% of incident visible electromagnetic radiation for all incident angles of the visible electromagnetic radiation between and including 0° and 45°;
the LiDAR reflecting dark colored paint reflects more than 60% of incident near-IR electromagnetic radiation with wavelengths between and including 850 nm and 950 nm for all incident angles of the near-IR electromagnetic radiation between and including 0° and 45°;
the LiDAR reflecting dark colored paint has a color with a lightness in CIELAB color space less than or equal to 40; and
the vehicle is detectable with LiDAR.

19. The vehicle of claim 18, wherein:
the first absorber material is a selective absorber material comprising at least one of $Fe_2O_3$, TiN, Cu and brass;
the first dielectric material is selected from at least one of ZnS, $MgF_2$ and $TiO_2$;
the second absorber material is a non-selective absorber material comprising at least one of Cr, Ge, Ni, stainless steel, Pd, Ti, Si, V, Co, W, Mo, Nb, and alloys thereof;
the third absorber material is a selective absorber material comprising at least one of $Fe_2O_3$, TiN, Cu and brass; and
the second dielectric material is selected from at least one of ZnS, $MgF_2$ and $TiO_2$.

20. The pigment of claim 1, wherein an interface between the first layer and the second layer is positioned so that there is a zero percentage electric field for a first target wavelength, or an interface between the second layer and the third layer is positioned so that there is a zero percentage electric field for a second target wavelength.

* * * * *